(12) United States Patent
Venkataramani et al.

(10) Patent No.: US 9,865,052 B2
(45) Date of Patent: Jan. 9, 2018

(54) CONTOUR-BASED DETERMINATION OF MALIGNANT TISSUE IN A THERMAL IMAGE

(71) Applicant: Niramai Health Analytix Pvt Ltd, Bangalore (IN)

(72) Inventors: Krithika Venkataramani, Karnataka (IN); Susmija Jabbireddy, Andhra Pradesh (IN); Himanshu J. Madhu, Mumbai (IN); Siva Teja Kakileti, Andhra Pradesh (IN)

( * ) Notice: Subject to any disclaimer, the term of this patent is extended or adjusted under 35 U.S.C. 154(b) by 40 days.

(21) Appl. No.: 15/074,222

(22) Filed: Mar. 18, 2016

(65) Prior Publication Data

US 2017/0270659 A1 Sep. 21, 2017

(51) Int. Cl.
*G06T 7/00* (2017.01)
*G06T 7/60* (2017.01)

(52) U.S. Cl.
CPC .......... *G06T 7/0012* (2013.01); *G06T 7/0081* (2013.01); *G06T 7/602* (2013.01); *G06T 2207/10016* (2013.01); *G06T 2207/10048* (2013.01); *G06T 2207/30068* (2013.01); *G06T 2207/30096* (2013.01)

(58) Field of Classification Search
CPC ................... G06T 7/0081; G06T 7/602; G06T 2207/30096; G06T 2207/10048; G06T 2207/30068; G06T 2207/10016
See application file for complete search history.

(56) References Cited

U.S. PATENT DOCUMENTS 8,620,041 B2 * 12/2013 Arnon .................... A61B 5/015
382/128

OTHER PUBLICATIONS

M. EtehadTavakol, S. Sadri, E.Y.K. Ng, "Application of K- and Fuzzy c-Means for Color Segmentation of Thermal Infrared Breast Images", Sep. 26, 2008, J. Med Syst (201) 34:35-42.*
Michel Gautherie, "Thermobiological Assessment of Benign and Malignant Breast Diseases", May 18, 1983, Am., J. Obstet. Gynecol., 147:861-869.*

(Continued)

*Primary Examiner* — Siamak Harandi
(74) *Attorney, Agent, or Firm* — The Law Office of Austin Bonderer, PC; Austin Bonderer

(57) ABSTRACT

What is disclosed is a system and method for contour-based determination of malignant tissue in a thermal image of a patient for cancer screening. In one embodiment, the method involves receiving a thermal image for cancer screening. Pixels in the thermal image with a higher temperature value are displayed in a first color and pixels with a lower temperature value are displayed in a second color. Pixels with temperature values between the lower and higher temperature values are displayed in gradations of color between the first and second colors. The thermal image is then analyzed to identify a patch of pixels with an elevated temperature relative to a temperature of pixels associated with surrounding tissue. Thereafter, tissue associated with the identified patch is determined to be malignant or non-malignant based a measure of irregularity calculated for boundary contour encompassing that patch of pixels.

16 Claims, 9 Drawing Sheets

(56) References Cited

OTHER PUBLICATIONS

Sella, T., et al., "A novel functional infrared imaging system coupled with multiparametric computerised analysis for risk assessment of breast cancer", European Radiology, Dec. 6, 2012, pp. 1191-1198, vol. 23, No. 5.

Venkataramani, K., et al., "Semi-automated Breast Cancer Tumor Detection with Thermographic Video Imaging", 37th Annual International Conference of the IEEE Engineering in Medicine and Biology Society, Aug. 25-29, 2015, pp. 2022-2025.

\* cited by examiner

CONTOUR-BASED DETERMINATION OF MALIGNANT TISSUE IN A THERMAL IMAGE

TECHNICAL FIELD

The present invention is directed to systems and methods for analyzing a thermal image to determine the presence of malignant tissue in a patient undergoing cancer screening.

BACKGROUND

Cancer incidence rates are relatively high in women. Nearly 1 in 8 women in the western world and nearly 1 in 11 women in India will have breast cancer. In the western world, it is the leading cancer in women. In India, for example, it is the second after cervical cancer. Early detection is key to survival as the mortality rates are high for advanced stages. Thermography is an emerging alternative non-invasive and non-contact screening method for cancer screening and detection. Radiologists and thermographers are increasingly demanding sophisticated techniques for analyzing a thermal image of cancer screening. The teachings hereof are directed to this effort.

BRIEF SUMMARY

What is disclosed is a system and method for contour-based determination of malignant tissue in a thermal image of a patient. In one embodiment, a thermal image of a patient is received for cancer screening. Pixels in the thermal image with a higher temperature value are displayed in a first color and pixels with a lower temperature value are displayed in a second color. Pixels with temperature values between the lower and higher temperature values are displayed in gradations of color between the first and second colors. The thermal image is analyzed to identify a patch of pixels with an elevated temperature relative to a temperature of pixels associated with surrounding tissue. The identified patch is analyzed, in a manner more fully disclosed herein, to determine whether that tissue is malignant based on a shape of a boundary contour of that patch of pixels.

Features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for contour-based determination of malignant tissue in a thermal image of a patient for cancer screening.

Non-Limiting Definitions

A "person" refers to either a male or a female. Gender pronouns are not to be viewed as limiting the scope of the appended claims strictly to females. Moreover, although the term "person" or "patient" is used interchangeably throughout this disclosure, it should be appreciated that the person undergoing cancer screening may be something other than a human such as, for example, a primate. Therefore, the use of such terms is not to be viewed as limiting the scope of the appended claims to humans.

Figure 1:
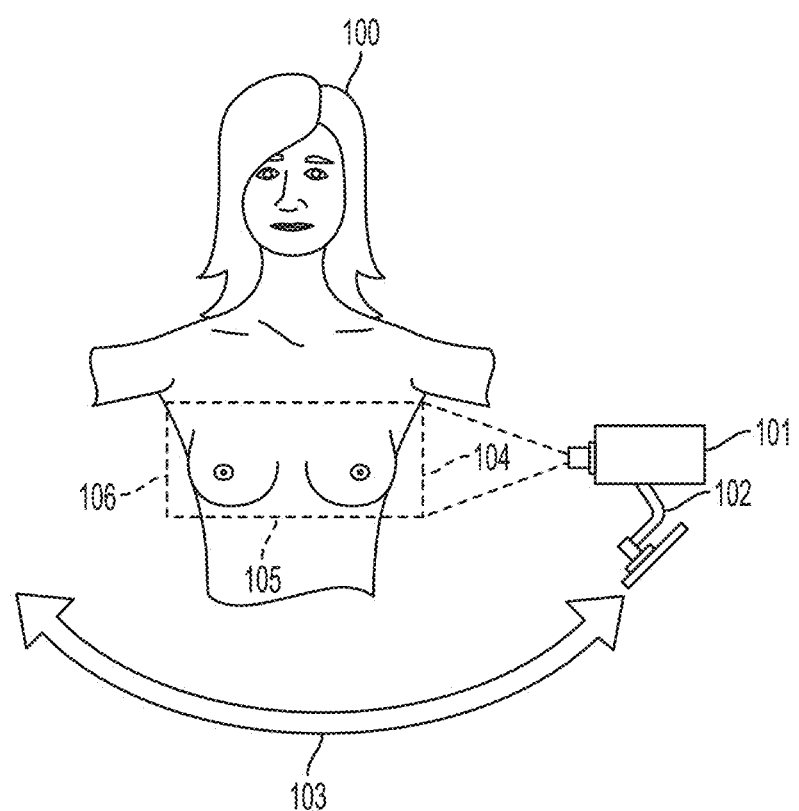
FIG. 1 shows an example female patient with a thermal camera mounted on a slideable and axially rotatable robotic arm for moving the camera along a semi-circular trajectory from side-to-side in front of the patient.

A "thermal camera" refers to either a still camera or a video camera with a lens that focuses infrared energy from objects in a scene onto an array of specialized sensors which convert infrared energy into electrical signals on a per-pixel basis and outputs a thermal image comprising an array of pixels with color values corresponding to temperatures of the objects in the image across a desired thermal wavelength band. FIG. 1 shows a thermal camera 101 mounted on a slideable and axially rotatable robotic arm 102 capable of moving the camera along a semi-circular trajectory 103 in the front of the patient from side-to-side such that thermographic images can be captured in a right-side view 104, a front view 105, and a left-side view 106, and various oblique angles in between. The thermal camera can be any of: a single-band infrared camera, a multi-band infrared camera in the thermal range, and a hyperspectral infrared camera in the thermal range. The resolution for a thermal camera is effectively the size of the pixel. Smaller pixels mean that more pixels will go into the thermal image giving the resulting image higher resolution and thus better spatial definition. Although thermal cameras offer a relatively large dynamic range of temperature settings, it is preferable that the camera's temperature range be relatively small, centered around the person's body surface temperature so that small temperature variations are amplified in terms of pixel color changes to provide a better measure of temperature variation. Thermal cameras are readily available in various streams of commerce. In one embodiment, the thermal camera is placed in wired or wireless communication with a workstation which enables manual or automatic control of various aspects of the thermal camera such as, for instance, adjusting a focus of the thermal camera lens, changing a resolution of the thermal camera, and changing a zoom level of the thermal camera.

Figure 2:
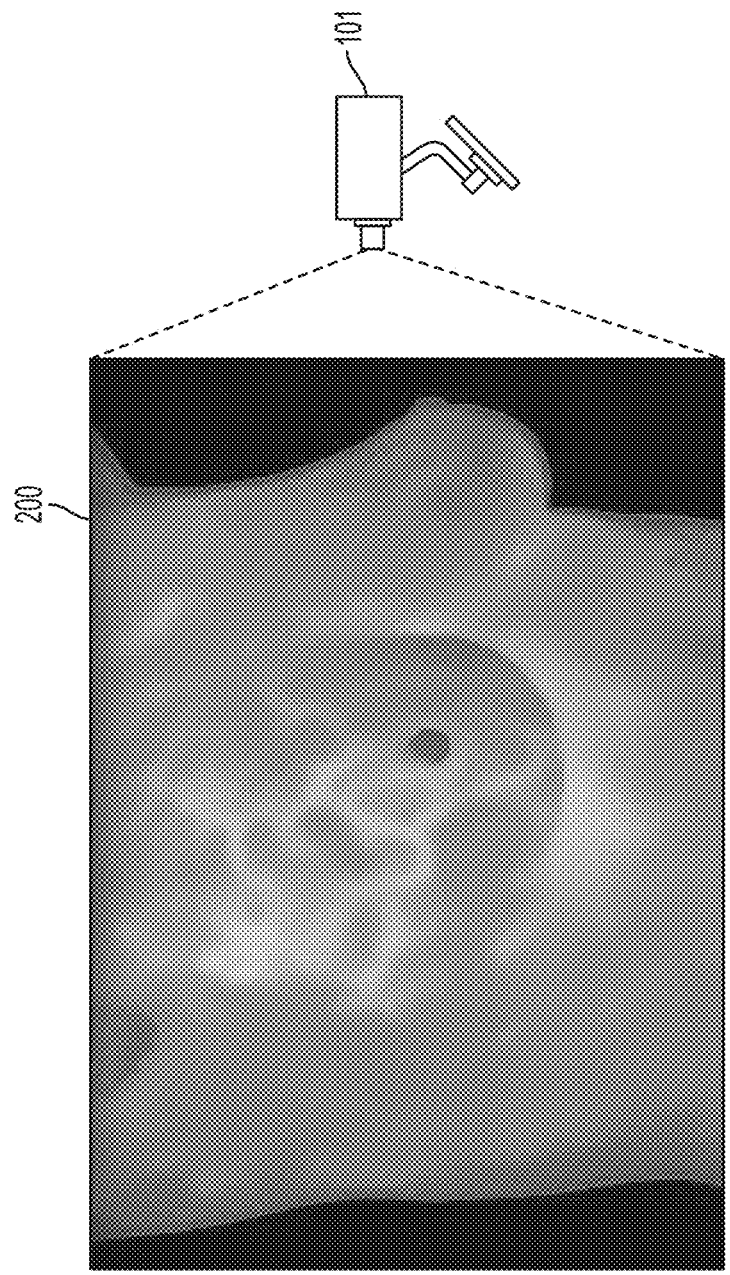
FIG. 2 shows a thermal image of an oblique view of a breast area of a female.

A "thermographic image" or simply "thermal image" comprises a plurality of pixels with each pixel having an associated corresponding temperature value. Pixels in the thermal image with a higher temperature value being displayed in a first color and pixels with a lower temperature value are displayed in a second color. Pixels with temperature values between the lower and higher temperature values are displayed in gradations of color between the first and second colors. FIG. 2 shows a thermal image 200 of an oblique view of a breast area. Although shown in black/white, it should be appreciated that the thermal image is a color image. Thermal images can be retrieved from a memory or storage device of the thermal imaging device, or obtained from a remote device over a network. Thermal images may be retrieved from a media such as a CDROM or DVD. Thermal images may be downloaded from a web-based system which makes such images available for processing. Thermal images can also be retrieved using an application such as those which are widely available for handheld cellular devices and processed on the user's cellphone or other handheld computing device such as an iPad or tablet. Use of the term "image" is intended to also mean "video".

"Receiving a thermal image" of a patient for cancer screening is intended to be widely construed and includes retrieving, capturing, acquiring, or otherwise obtaining video image frames. The image can be received or retrieved from a remote device over a network, or from a media such as a CDROM or DVD. The image may be downloaded from a web-based system or application which makes video available for processing in accordance with the methods disclosed herein. The image can also be received from an application such as those which are available for handheld cellular devices and processed on the cellphone or other handheld computing device such as an iPad or Tablet-PC. The image can be received directly from a memory or storage device of the imaging device used to capture that image or video. The received thermal image is analyzed.

Figure 3:
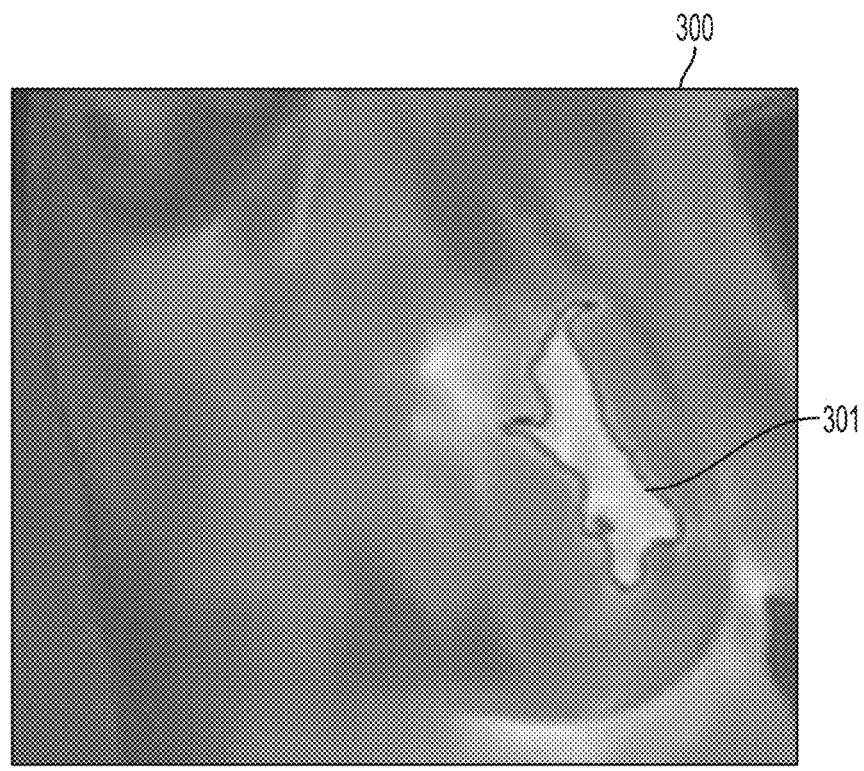
FIG. 3 shows a thermal image of a breast area with a boundary contour around a patch of pixels identified for analysis using the methods disclosed herein.
Figure 4:
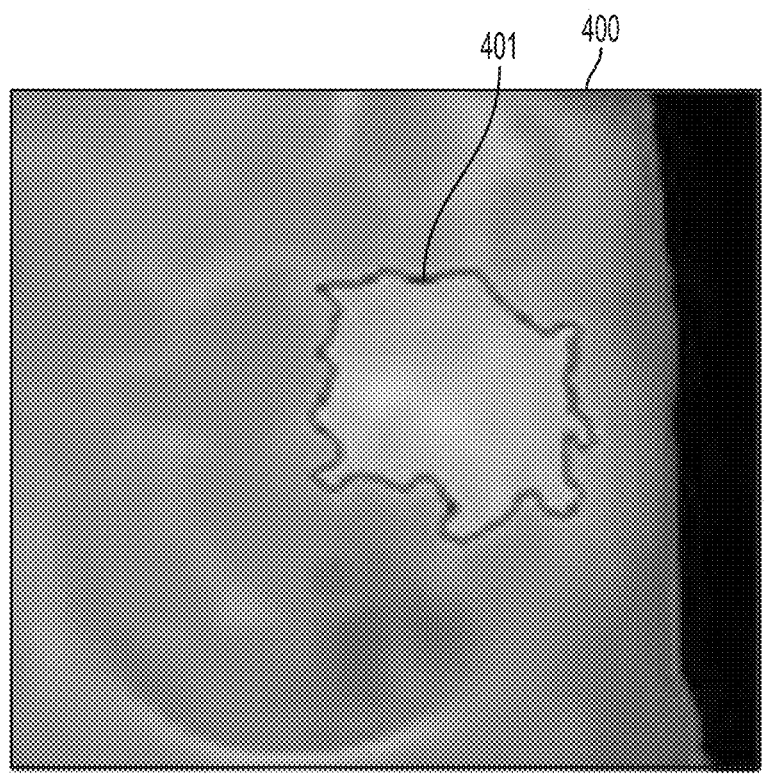
FIG. 4 shows a thermal image of a breast area with another boundary contour around a patch of pixels identified for analysis using the methods disclosed herein.

"Analyzing the thermal image" means to identify a patch of pixels with an elevated temperature relative to a temperature of pixels associated with surrounding tissue. FIG. 3 shows a thermal image 300 of a breast with a boundary contour 301 around a patch of pixels having a temperature value that is higher than a temperature value of pixels in surrounding tissue. FIG. 4 shows a thermal image 400 of a breast area with another boundary contour 401 around a patch of pixels identified for analysis using the methods disclosed herein. A patch of pixels may be manually or automatically selected in the thermal image using, for example, temperatures of the isotherms of the thermal image. The patch of pixels is processed to calculate a measure of irregularity.

A "centroid" of a shape is the mean position of all points in all coordinate directions within that shape, also referred to as the geometric center. The geometric center of a 2-dimensional planar lamina or a 3-dimensional solid is often represented in coordinates. The coordinates of the centroid define what is called the center of gravity of the shape. In physics, the center of mass is the arithmetic mean of all points weighted by the local density or specific weight. If a physical object has uniform density then its center of mass is the same as the centroid of its shape. Centroids of basic shapes can be intuitive such as the geometric center of a circle or sphere. Centroids of arbitrary shapes can be found using applied calculus. Determining a centroid of an arbitrary shape is computationally intensive but such methods are well established in the math and computer science arts.

For explanatory purposes, point 302 is determined to be the centroid of the shape defined by the boundary contour 301.

Figure 5:
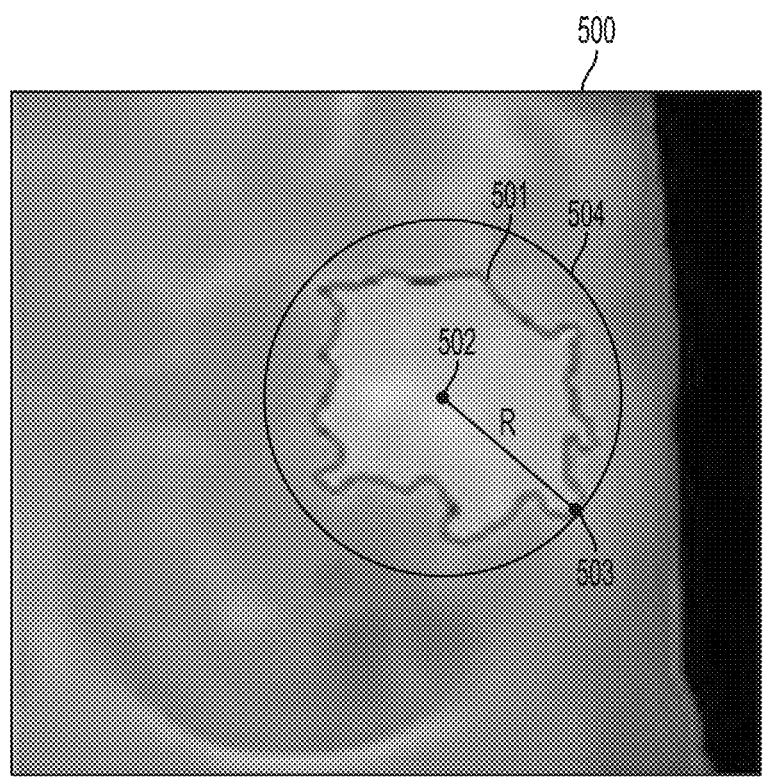
FIG. 5 shows the thermal image of FIG. 4 with a circle with a radius equal to the distance between the centroid and a farthest point on the boundary contour of the pixel patch such that the measure of irregularity can be determined.

"Calculate a measure of irregularity" means to determine whether a boundary contour of a patch of pixels is regular or irregular. In one embodiment, the measure of irregularity means to calculate an area of a circle with a radius equal to a distance from the centroid of the pixel patch to a farthest point on the boundary contour. In FIG. 5, the radius R of the circle 504 is a line between the centroid 502 and farthest boundary point 503. The area of a circle is $\pi R^2$ where R is in pixels. The area of the shape 501 is determined by the number of pixels within that shape given that a size of each pixel is given by the resolution of the imaging device. Thus, area can be given in terms of pixels. If a ratio of the area of the circle to the area of the pixel patch is at or above a pre-defined threshold, as set by a user or medical practitioner, then the boundary contour of that pixel patch is determined to be irregular. Otherwise, the pixel patch is determined to be regular. Assume, for discussion purposes, that this ratio is 1.30. If the medical practitioner has set the threshold at, for example, 0.90 for this particular patient, then the shape of the boundary contour of the pixel patch would be determined to be irregular.

Figure 6:
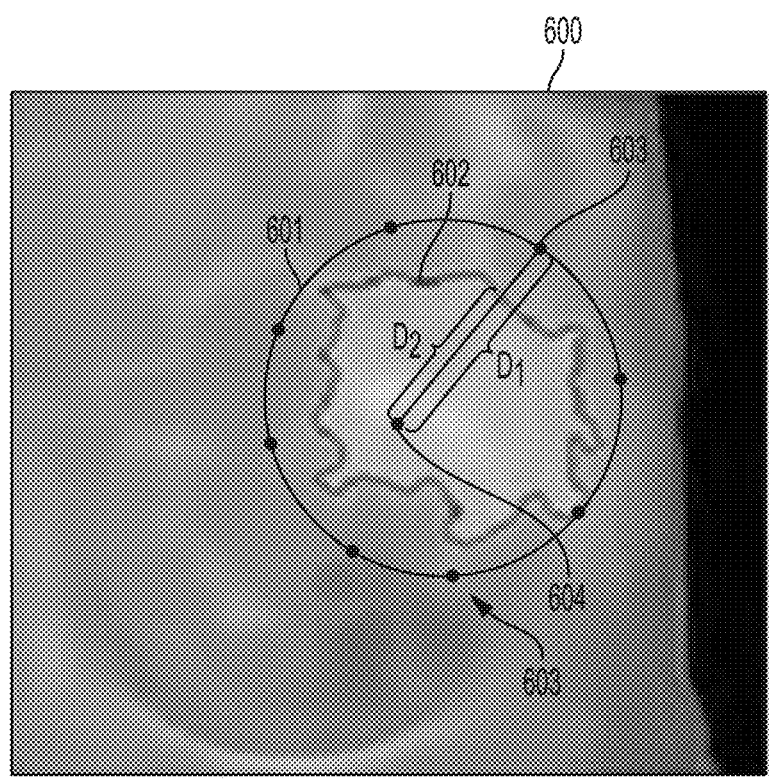
FIG. 6 shows the thermal image of FIG. 4 wherein a plurality of points have been selected along a best-fit circle around the pixel patch such that the measure of irregularity can be determined.

In another embodiment, as in FIG. 6, plurality of points 603 have been selected along a best-fit circle 601 placed around the pixel patch 602 in the thermal image 600. A centroid 604 of the pixel patch is calculated. A first distance $D_1$ is calculated of a line from each of the selected points to the centroid. A second distance $D_2$ is calculated of each of those lines from a point where the lines pass through the boundary contour to the centroid. Thereafter, a standard deviation of the first and second distances is calculated for all points 603. If the amount of deviation is at or above a threshold, as defined by a user or medical practitioner, then the shape of the boundary contour 602 of the pixel patch is determined to be irregular. Otherwise, the pixel patch is determined to be regular. The technique of FIG. 6 can be used with a best-fit ellipse around the pixel patch and best-fit polynomial curve with an $N \leq 5$ degree polynomial around the pixel patch.

It should be appreciated that the steps of "receiving", "analyzing", "communicating", "performing", "determining", "calculating", "selecting", and the like, as used herein, include the application of any of a variety of techniques as well as mathematical operations according to any specific context or for any specific purpose. It should be appreciated that such steps may be facilitated or otherwise effectuated by a microprocessor executing machine readable program instructions such that the intended functionality is effectively performed.

Flow Diagram of One Embodiment

Figure 7:
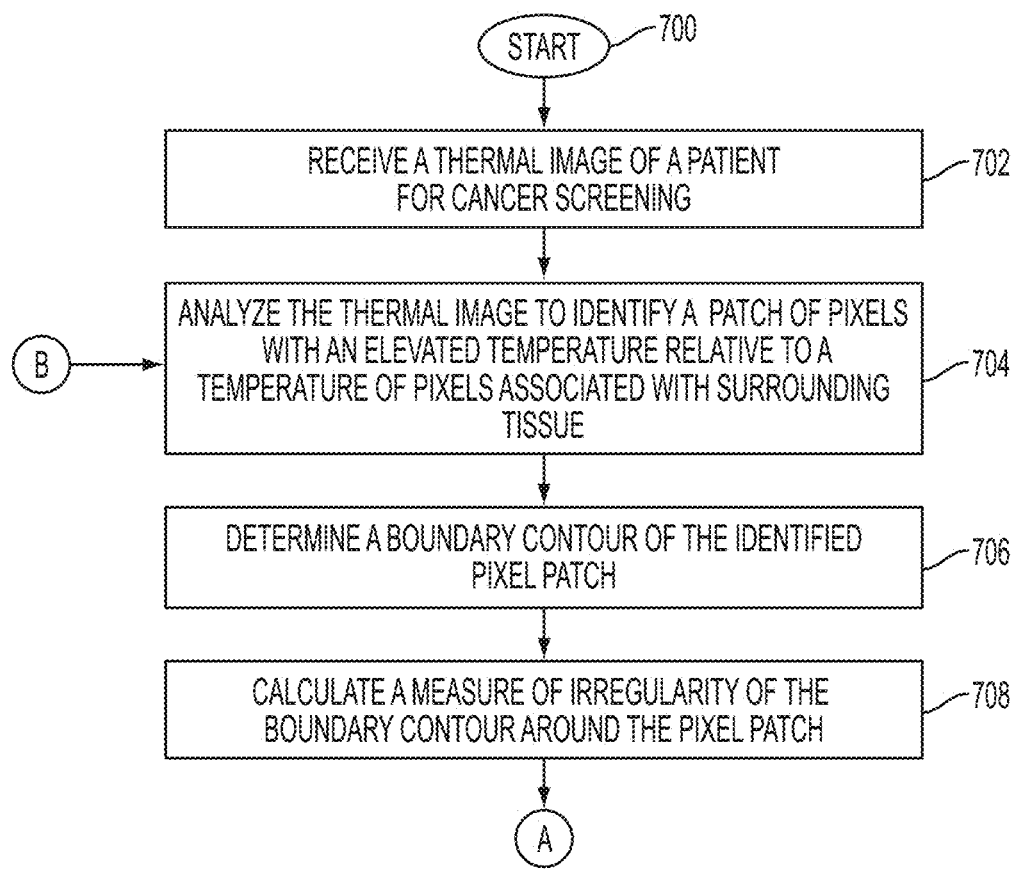
FIG. 7 is a flow diagram which illustrates one embodiment of the present method for contour-based determination of malignant tissue in a thermal image.

Reference is now being made to the flow diagram of FIG. 7 which illustrates one embodiment of the present method for contour-based determination of malignant tissue in a thermal image. Flow processing begins at step 700 and immediately proceeds to step 702.

At step 702, receive a thermal image of a patient for cancer screening. One example thermal image is shown in FIG. 2.

At step 704, analyze the thermal image to identify a patch of pixels with an elevated temperature relative to a temperature of pixels associated with surrounding tissue.

At step 706, determine a boundary contour of the identified patch of pixels. Pixel patches and boundary contours are shown in FIGS. 2 and 3.

At step 708, calculate a measure of irregularity of the boundary contour around the pixel patch. Embodiments are shown and discussed with respect to FIGS. 5 and 7.

Figure 8:
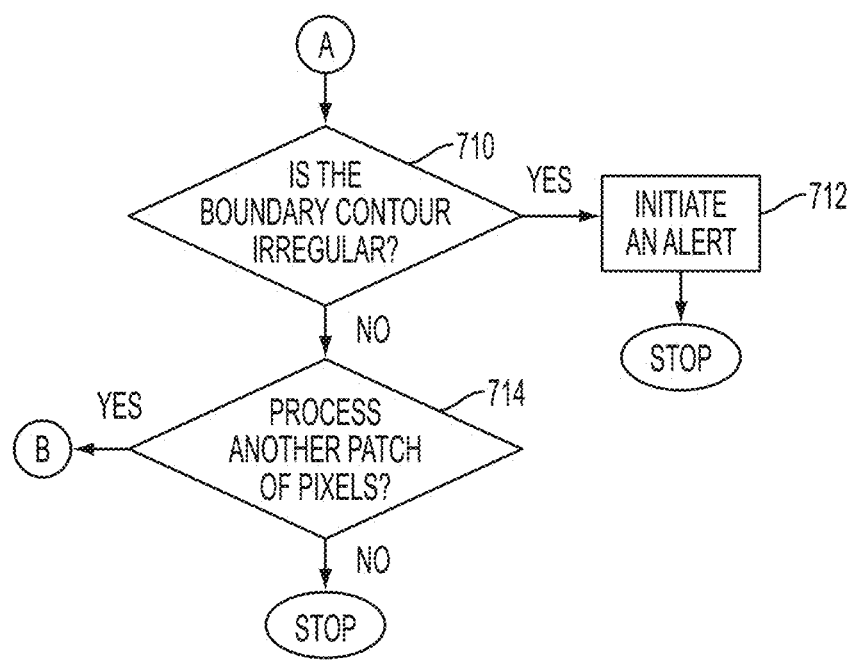
FIG. 8 is a continuation of the flow diagram of FIG. 7 with flow processing continuing with respect to node A.

Reference is now being made to FIG. 8 which is a continuation of the flow diagram of FIG. 7 with flow processing continuing with respect to node A.

At step 710, a determination is made whether the boundary contour of the pixel patch is irregular. If the boundary contour of the pixel patch is irregular then, at step 712, initiate an alert. The alert may take the form of a message displayed on a display device or a sound activated at, for example, a nurse's station or a display of a device. The alert may take the form of a colored or blinking light which provides a visible indication that an alert condition exists. The alert can be a text, audio, and/or video message. The alert may be communicated to one or more remote devices over a wired or wireless network. The alert may be sent directly to a handheld wireless cellular device of a medical professional. In this embodiment, after the alert signal is initiated, further processing stops. Otherwise, processing continues.

At step 714, a determination is made to process another patch of pixels. If so then processing continues with respect to node B wherein, at step 704 a next patch of pixels is identified for processing. Processing repeats in a similar manner for the next pixel patch until no more pixel patches are to be processed. Thereafter, in this embodiment, further processing stops.

It should also be appreciated that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims.

Block Diagram of Image Processing System

Figure 9:
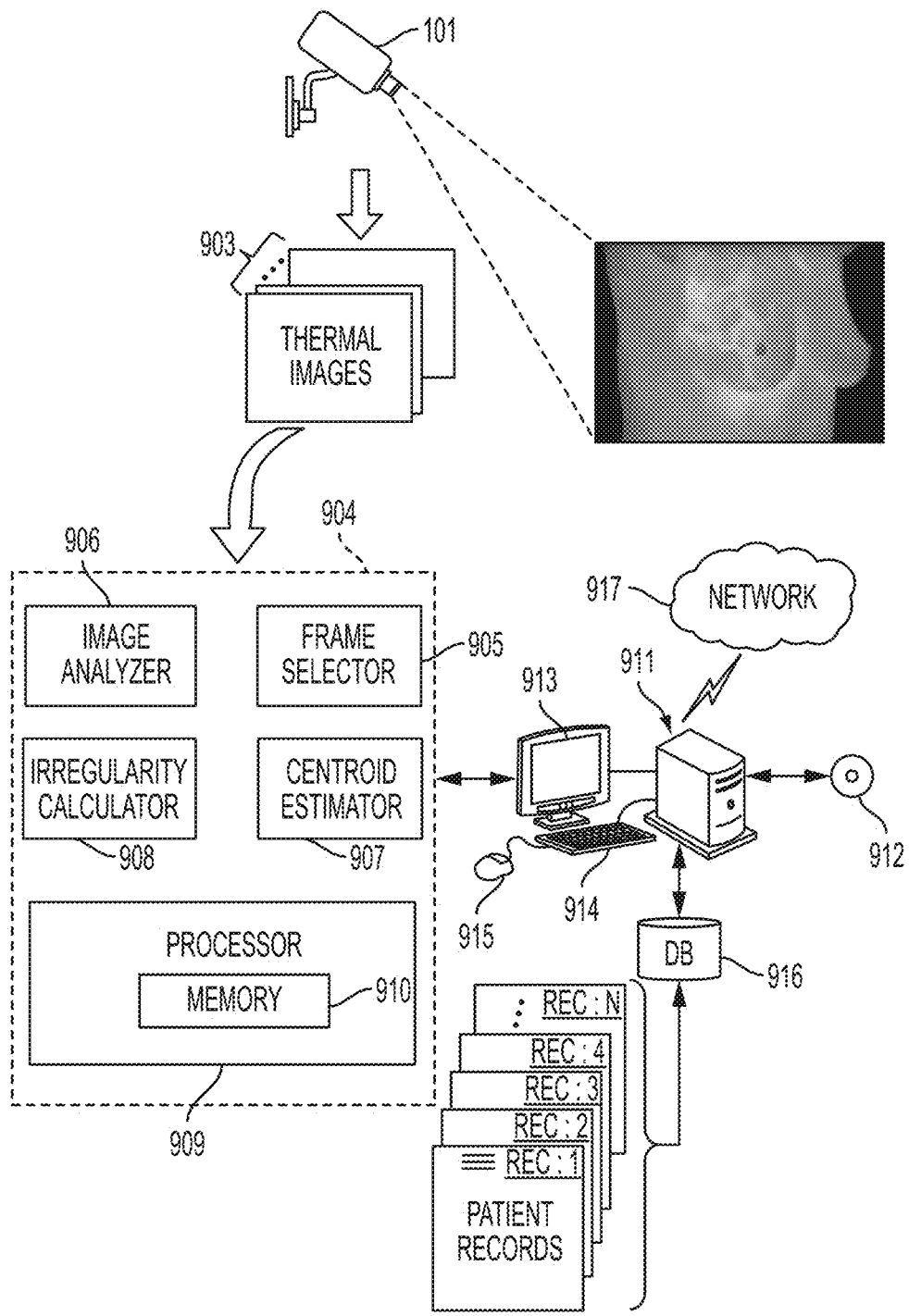
FIG. 9 is a block diagram of one example image processing system for processing a thermal image in accordance with the embodiment described with respect to the flow diagrams of FIGS. 7 and 8.

Reference is now being made to FIG. 9 which shows a block diagram of one example image processing system for processing a thermal image in accordance with the embodiment described with respect to the flow diagrams of FIGS. 7 and 8.

In FIG. 9, imaging device 101 is shown acquiring streaming video of a breast area of the patient in FIG. 2. Thermal image frames (collectively at 903) are communicated to the image processing system 904 wherein various aspects of the methods disclosed herein are performed. Frame Selector 905 receives the image frames and enables a user to make a selection as to a particular thermal image to be processed. Image Analyzer 906 receives the thermal image and analyzes the thermal image to identify a patch of pixels with an elevated temperature relative to a temperature of pixels associated with surrounding tissue. The Image Analyzer proceeds to draw a boundary around a contour of the pixel patch. Centroid Estimator 907 calculates (or estimates) a location of a centroid of the shape encompassed by the boundary contour. Irregularity Calculator 908 receives the coordinates of the centroid from the Centroid Estimator and proceeds to calculate a measure of irregularity using any of the methods disclosed herein. Central Processor (CPU) 909 retrieves machine readable program instructions from Memory 910 and is provided to facilitate the functionality of any of the modules of the system 904. The processor 909, operating alone or in conjunction with other processors and memory, may be configured to assist or otherwise perform the functionality of any of the processors and modules of system 904. Processor 909 further communicates the results to the display device of workstation 911.

A computer case of the workstation 911 houses various components such as a motherboard with a processor and memory, a network card, a video card, a hard drive capable of reading/writing to machine readable media 912 such as a floppy disk, optical disk, CD-ROM, DVD, magnetic tape, and the like, and other software and hardware needed to perform the functionality of a computer workstation. The workstation further includes a display device 913, such as a CRT, LCD, or touchscreen device, for displaying information, images, data, computed values, medical information, results, locations, and the like. A user can view any of that information and make a selection from menu options displayed thereon. Keyboard 914 and mouse 915 effectuate a user input or selection.

The workstation implements a database in storage device 916 wherein patient records are stored, manipulated, and retrieved in response to a query. Such records, in various embodiments, take the form of patient medical history stored in association with information identifying the patient along with medical information. Although the database is shown as an external device, the database may be internal to the workstation mounted, for example, on a hard disk therein. It should be appreciated that the workstation has an operating system and other specialized software configured to display alphanumeric values, menus, scroll bars, dials, slideable bars, pull-down options, selectable buttons, and the like, for entering, selecting, modifying, and accepting information needed for processing image frames. The workstation is further enabled to display thermal images.

In other embodiments, a user or technician may use the user interface of the workstation to identify patches of pixels for processing, set parameters, select image frames and/or regions of images for processing. These selections may be stored/retrieved in a storage devices 912 and 916. Default settings and initial parameters can be retrieved from any of the storage devices shown, as desired. Further, a user may adjust the various parameters being employed or dynamically settings in real-time as successive batches of image frames are received for processing.

Although shown as a desktop computer, it should be appreciated that the workstation can be a laptop, mainframe, or a special purpose computer such as an ASIC, circuit, or the like. The embodiment of the workstation of FIG. 9 is illustrative and may include other functionality known in the arts. Any of the components of the workstation may be placed in communication with the image processing system 904 or any devices in communication therewith. Moreover, any of the modules and processing units of system 904 can be placed in communication with storage device 916 and/or computer readable media 912 and may store/retrieve therefrom data, variables, records, parameters, functions, and/or machine readable/executable program instructions, as needed to perform their intended functions. Each of the modules of the video processing system may be placed in communication with one or more remote devices over network 917. It should be appreciated that some or all of the functionality performed by any of the modules or processing units of system 904 can be performed, in whole or in part, by the workstation placed in communication with the video imaging device 101 over network 917. The embodiment shown is illustrative and should not be viewed as limiting the scope of the appended claims strictly to that configuration. Various modules may designate one or more components which may, in turn, comprise software and/or hardware designed to perform the intended function.

The teachings hereof can be implemented in hardware or software using any known or later developed systems, structures, devices, and/or software by those skilled in the applicable art without undue experimentation from the functional description provided herein with a general knowledge of the relevant arts. One or more aspects of the methods described herein are intended to be incorporated in an article of manufacture which may be shipped, sold, leased, or otherwise provided separately either alone or as part of a product suite or a service.

It will be appreciated that the above-disclosed and other features and functions, or alternatives thereof, may be desirably combined into other different systems or applications. Presently unforeseen or unanticipated alternatives, modifications, variations, or improvements may become apparent and/or subsequently made by those skilled in this art which are also intended to be encompassed by the following claims. The teachings of any textbooks, papers, or other publications referenced herein are each hereby incorporated herein in their entirety by reference.

What is claimed is:

1. A method for contour-based determination of malignant tissue in a thermal image of a patient for cancer screening, the method comprising:
    receiving a thermal image of a patient for cancer screening, wherein the thermal image is captured by a thermal imaging camera, the thermal imaging camera comprising:
        an array of sensors that converts infrared energy into electrical signals on a per-pixel basis;
        a lens that focuses the infrared energy from the patient's breast onto the array of sensors, wherein the array of sensors detects temperature values from the patient's breast; and
        a specialized processor that processes the detected temperature values into at least one block of pixels to generate the thermal image,
    wherein pixels in the thermal image with a higher temperature value being displayed in a first color and pixels with a lower temperature value being displayed in a second color, pixels with temperature values between the lower and higher temperature values being displayed in gradations of color between the first and second colors;
    analyzing the thermal image to identify a patch of pixels with an elevated temperature relative to a temperature of pixels associated with surrounding tissue;
    determining a boundary contour of the identified patch of pixels;
    calculating a measure of irregularity of the boundary contour, wherein the measure of irregularity is calculated by
        selecting a plurality of points along a best-fit ellipse around the pixel patch;
        calculating a distance between the points along the boundary contour and the points along a best-fit ellipse; and
        determining, in response to the distance being at or above a threshold, that a shape of the boundary contour of the pixel patch is determined to be irregular, and regular otherwise;
    determining, based on the measure of irregularity, that tissue associated with the pixel patch is malignant and non-malignant otherwise; and
    displaying the irregular boundary contour that represents the malignant tissue and the regular boundary contour that represents the non-malignant tissue in different colors.

2. The method of claim 1, wherein calculating the measure of irregularity comprises:
    calculating a centroid of the pixel patch;
    calculating an area of the pixel patch;
    calculating an area of a circle with a radius equal to a distance from the centroid to a farthest point on the boundary contour; and
    determining, in response to the ratio of an area of the circle to the area of the pixel patch being above a threshold, that the shape of the boundary contour of the pixel patch is determined to be irregular, and regular otherwise.

3. The method of claim 1, wherein calculating the measure of irregularity comprises:
    calculating a centroid of the pixel patch;
    selecting a plurality of points along a best-fit circle around the pixel patch;
    calculating a first distance of a line from each of the selected points to the centroid;
    calculating a second distance of each of the lines from a point along the boundary contour to the centroid;
    calculating a standard deviation of the first and second distances; and
    determining, in response to an amount of the deviation being at or above a threshold, that the shape of the boundary contour of the pixel patch is determined to be irregular, and regular otherwise.

4. The method of claim 1, wherein calculating the measure of irregularity comprises:
    selecting a plurality of points along a best-fit polynomial curve with an N-degree polynomial around the pixel patch, where $N \leq 5$ and $N \geq 2$;
    calculating a distance between the points along the best fit polynomial curve and the points on the boundary contour; and
    determining, in response to the distance being at or above a threshold, that the shape of the boundary contour of the pixel patch is determined to be irregular, and regular otherwise.

5. The method of claim 1, wherein the image is obtained from any imaging modality.

6. The method of claim 1, wherein the image is one of: a breast area, and a non-breast area.

7. The method of claim 1, wherein, in response to said tissue being malignant, performing any of: initiating an alert, and signaling a professional.

8. The method of claim 1, wherein said images are a streaming video and a determination of malignancy occurs in real-time.

9. A system for contour-based determination of malignant tissue in a thermal image of a patient for cancer screening, the system comprising:
    a thermal imaging camera, wherein a thermal image is captured by the thermal imaging camera, the thermal imaging camera comprising:
        an array of sensors that converts infrared energy into electrical signals on a per-pixel basis;
        a lens that focuses the infrared energy from the patient's breast onto the array of sensors, wherein the array of sensors detects temperature values from the patient's breast; and
        a specialized processor that processes the detected temperature values into at least one block of pixels to generate the thermal image;
    a storage device; and a processor in communication with said storage device, said processor executing machine readable instructions for performing:
receiving a thermal image of a patient for cancer screening from said thermal imaging camera, pixels in the thermal image with a higher temperature value being displayed in a first color and pixels with a lower temperature value being displayed in a second color, pixels with temperature values between the lower and higher temperature values being displayed in gradations of color between the first and second colors;
analyzing the thermal image to identify a patch of pixels with an elevated temperature relative to a temperature of pixels associated with surrounding tissue;
determining a boundary contour of the identified patch of pixels;
calculating a measure of irregularity of the boundary contour, wherein the measure of irregularity is calculated by
selecting a plurality of points along a best-fit ellipse around the pixel patch;
calculating a distance between the points along the boundary contour and the points along a best-fit ellipse; and
determining, in response to the distance being at or above a threshold, that a shape of the boundary contour of the pixel patch is determined to be irregular, and regular otherwise;
determining, based on the measure of irregularity, that tissue associated with the pixel patch is malignant and non-malignant otherwise; and
displaying the irregular boundary contour that represents the malignant tissue and the regular boundary contour that represents the non-malignant tissue in different colors.

10. The system of claim 9, wherein calculating the measure of irregularity comprises:
calculating a centroid of the pixel patch;
calculating an area of the pixel patch;
calculating an area of a circle with a radius equal to a distance from the centroid to a farthest point on the boundary contour; and
determining, in response to the ratio of an area of the circle to the area of the pixel patch being above a threshold, that the shape of the boundary contour of the pixel patch is determined to be irregular, and regular otherwise.

11. The system of claim 9, wherein calculating the measure of irregularity comprises:
calculating a centroid of the pixel patch;
selecting a plurality of points along a best-fit circle around the pixel patch;
calculating a first distance of a line from each of the selected points to the centroid;
calculating a second distance of each of the lines from a point along the boundary contour to the centroid;
calculating a standard deviation of the first and second distances; and
determining, in response to an amount of the deviation being at or above a threshold, that the shape of the boundary contour of the pixel patch is determined to be irregular, and regular otherwise.

12. The system of claim 9, wherein calculating the measure of irregularity comprises:
selecting a plurality of points along a best-fit polynomial curve with an N-degree polynomial around the pixel patch, where $N \leq 5$ and $N \geq 2$;
calculating a distance between the points along the best fit polynomial curve and the points on the boundary contour; and
determining, in response to the distance being at or above a threshold, that the shape of the boundary contour of the pixel patch is determined to be irregular, and regular otherwise.

13. The system of claim 9, wherein the image is obtained from any imaging modality.

14. The system of claim 9, wherein the image is one of: a breast area, and a non-breast area.

15. The system of claim 9, wherein, in response to said tissue being malignant, performing any of: initiating an alert, and signaling a professional.

16. The system of claim 9, wherein said images are a streaming video and a determination of malignancy occurs in real-time.

* * * * *